US009946388B2

(12) United States Patent
Mori et al.

(10) Patent No.: US 9,946,388 B2
(45) Date of Patent: Apr. 17, 2018

(54) TOUCH SENSOR WITH IMPROVED PRESSURE SENSING CHARACTERISTICS

(71) Applicant: Murata Manufacturing Co., Ltd., Nagaokakyo-shi, Kyoto-fu (JP)

(72) Inventors: Kenichi Mori, Nagaokakyo (JP); Hiroyuki Nakaji, Nagaokakyo (JP); Hidekazu Kano, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/207,932

(22) Filed: Jul. 12, 2016

(65) Prior Publication Data
US 2016/0320893 A1 Nov. 3, 2016

Related U.S. Application Data

(63) Continuation of application No. PCT/JP2015/060435, filed on Apr. 2, 2015.

(30) Foreign Application Priority Data

Apr. 7, 2014 (JP) ................ 2014-078483

(51) Int. Cl.
*G06F 3/041* (2006.01)
*G01L 1/16* (2006.01)
*G06F 3/044* (2006.01)

(52) U.S. Cl.
CPC .............. *G06F 3/0414* (2013.01); *G01L 1/16* (2013.01); *G06F 3/044* (2013.01); *G06F 3/0416* (2013.01); *G06F 2203/04105* (2013.01)

(58) Field of Classification Search
CPC ................... G06F 3/044; G06F 3/0416
(Continued)

(56) References Cited

U.S. PATENT DOCUMENTS 9,200,970 B2   12/2015   Kodani et al.
9,348,473 B2    5/2016   Ando
(Continued)

FOREIGN PATENT DOCUMENTS

JP    H0561592 A      3/1993
JP    2010108490 A    5/2010
(Continued)

OTHER PUBLICATIONS

International Search Report issued for PCT/JP2015/060435, dated Jun. 16, 2015.
(Continued)

*Primary Examiner* — Calvin C Ma
(74) *Attorney, Agent, or Firm* — Arent Fox LLP

(57) ABSTRACT

A pressure sensor includes a piezoelectric detection electrode, an insulating substrate, a piezoelectric base film, a piezoelectric detection electrode and an insulating substrate. The insulating substrate includes a top face and a bottom face on which the piezoelectric detection electrode is formed. The insulating substrate includes a top face and a bottom face on which the piezoelectric detection electrode is formed. The pressure sensor includes the piezoelectric film whose opposite principal surfaces are provided with respective piezoelectric detection electrodes. When viewed from a direction orthogonal to the principal surfaces, an opening is provided in a center region of one of the piezoelectric detection electrodes provided on at least one of the principal surfaces.

19 Claims, 21 Drawing Sheets

(58) Field of Classification Search
USPC .................................................. 345/173–174
See application file for complete search history.

(56) References Cited

U.S. PATENT DOCUMENTS

| | | | | |
|---|---|---|---|---|
| 2009/0226655 A1* | 9/2009 | Sugai | ....................... | C08J 3/201 |
| | | | | 428/36.92 |
| 2012/0274599 A1* | 11/2012 | Schediwy | ............... | G06F 3/016 |
| | | | | 345/174 |
| 2013/0027339 A1* | 1/2013 | Kodani | ..................... | G01L 1/16 |
| | | | | 345/173 |
| 2014/0152618 A1 | 6/2014 | Ando | | |
| 2014/0210601 A1* | 7/2014 | Sato | ........................ | G06F 3/041 |
| | | | | 340/407.2 |
| 2015/0346881 A1 | 12/2015 | Watazu | | |
| 2016/0109983 A1 | 4/2016 | Ando | | |

FOREIGN PATENT DOCUMENTS

| | | | |
|---|---|---|---|
| JP | 2011221721 A | 11/2011 |
| JP | 2014134452 A | 7/2014 |
| JP | 2014173950 A | 9/2014 |
| WO | 2011125408 A1 | 10/2011 |
| WO | 2013021835 A1 | 2/2013 |

OTHER PUBLICATIONS

Written Opinion of the International Searching Authority issued for PCT/JP2015/060435, dated Jun. 16, 2015.

\* cited by examiner

TOUCH SENSOR WITH IMPROVED PRESSURE SENSING CHARACTERISTICS

CROSS REFERENCE TO RELATED APPLICATIONS

The present application is a continuation of International application No. PCT/JP2015/060435, filed Apr. 2, 2015, which claims priority to Japanese Patent Application No. 2014-078483, filed Apr. 7, 2014, the entire contents of each of which are incorporated herein by reference.

FIELD OF THE INVENTION

The present invention relates to a touch sensor and a display device having a touch sensor which detects a pressure applied to an input surface by a user pressing against the input surface.

BACKGROUND OF THE INVENTION

Various touch input devices are known. They typically detect the location on the input surface which is touched and the level of pressure applied to the input surface.

For example, the touch input device described in Japanese Patent Application Laid-Open No. 5-61592 includes a touch sensor obtained by overlapping a flat pressure sensor and a flat position sensor. The pressure sensor detects a distortion in a thickness direction, and therefor detects the level of pressing force applied to the input surface. The capacitive sensor detects the position at which the user touches the input surface.

In Japanese Patent Application Laid-Open No. 5-61592 electrodes are formed on the entirety of opposed surfaces of a piezoelectric substrate to increase an output of the pressure sensor. However, according to this method, the relationship between the amount that the pressure sensor is distorted and the force with which the user presses down on the input surface differs depending on the position (a pressing position) on the input surface against which the user presses his or her finger. More specifically, the amount that the pressure sensor is distorted (for a given pressing force) is greater in the center region of the pressure sensor than it is at the outer peripheral regions of the pressure sensor. That is, even though the pressing forces are the same, the amount of electric charges produced by the pressure sensor varies as a function of the pressing position.

Hence, the touch input device described in Japanese Patent Application Laid-Open No. 5-61592 has a problem that it is necessary to correct an output of the pressure sensor as a function of the location of the pressing position. As a result, the required processing becomes complex.

It is therefore an object of the present invention to provide a touch sensor which can prevent (or at least mitigate) an output from varying as a function of the pressing position.

SUMMARY OF THE INVENTION

In accordance with an embodiment of the present invention, a touch sensor, comprises:
a pressure sensor including:
a piezoelectric film having opposed principal surfaces;
a first set of piezoelectric detection electrodes located on a peripheral area of the first principal surface and not located on a central area of the first principal surface; and
a second set of piezoelectric detection electrodes located on the second principal surface;
whereby electric charges are generated in the first and second detection electrodes as a function of an external pressure applied to the pressure sensor.

The touch sensor can include a third set of electrodes located on central area of the first principal surface to make the visual pattern of touch sensor (as viewed from the input surface, more consistent. However, the third set of electrodes is insulated from the first set of electrodes and the charges generated by the third set of electrodes are not used to detect the pressure applied to the input surface.

The piezo electric film is preferably elongated and has shorter lateral sides and longer longitudinal sides. The first set of electrodes form a pattern having lateral and longitudinal sides. The width of the lateral sides of the first set of electrodes being shorter than a width of the longitudinal sides of the first set of electrodes. This further reduces variations in the electric charges produced by the pressure sensor as a function of the pressing location.

The central area preferably has a symmetric shape whose center axis is coincident with a center axis of the piezoelectric film.

The second set of piezoelectric detection electrodes are preferably located on a peripheral area of the second principal surface and are not located in a central area of the second principal surface.

The piezoelectric film is preferably made of a chiral polymer, more preferably made of polylactic acid and even more preferably made poly-L-lactic acid.

In accordance with an embodiment of the present invention, a display device, comprises:
(A) an input surface;
(B) a pressure sensor including:
(i) a piezoelectric film having opposed principal surfaces;
(ii) a first set of piezoelectric detection electrodes located on a peripheral area of the first principal surface and are not located on a central area of the first principal surface; and
(iii) a second set of piezoelectric detection electrodes located on the second principal surface whereby electric charges are generated in the first and second detection electrodes as a function of an external pressure applied to the input surface; and
(C) a processor for detecting an amount of pressure applied to the input surface as a function of the electric charges.

The pressure sensor of the display device can include a third set of electrodes located on central area of the first principal surface to make the visual pattern of touch sensor (as viewed from the input surface, more consistent. However, the third set of electrodes is insulated from the first set of electrodes and the charges generated by the third set of electrodes are not used to detect the pressure applied to the input surface.

The piezo electric film is preferably elongated and has shorter lateral sides and longer longitudinal sides. The first set of electrodes form a pattern having lateral and longitudinal sides. The width of the lateral sides of the first set of electrodes being shorter than a width of the longitudinal sides of the first set of electrodes. This further reduces variations in the electric charges produced by the pressure sensor as a function of the pressing location.

The central area preferably has a symmetric shape whose center axis is coincident with a center axis of the piezoelectric film.

The second set of piezoelectric detection electrodes are preferably located on a peripheral area of the second principal surface and are not located in a central area of the second principal surface.

The piezoelectric film is preferably made of a chiral polymer, more preferably made of polylactic acid and even more preferably made poly-L-lactic acid.

The display device can also include a capacitive sensor comprising:

(i) a dielectric substrate having first and second principal surfaces; and (ii) position detection electrodes formed on at least one of the principal surfaces of the dielectric substrate;

wherein the capacitive sensor is located below the input surface and the pressure sensor is arranged below the capacitive sensor such that the capacitive sensor is located closer to the input surface than the pressure sensor.

DETAILED DESCRIPTION OF PREFERRED

Embodiments of the Invention

Figure 1:
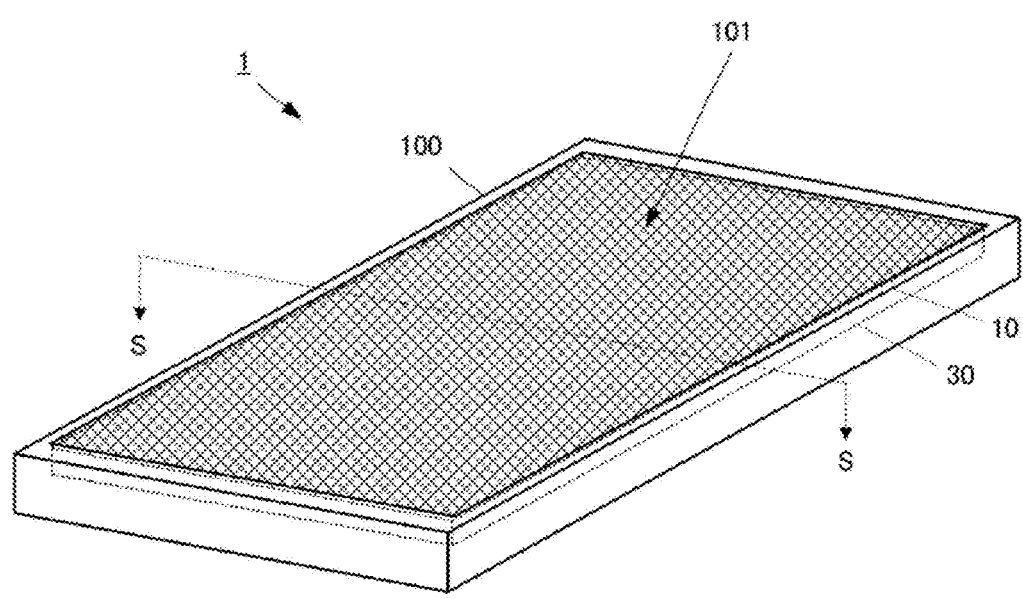
FIG. 1 is an external appearance perspective view of a display device 1 which includes a touch sensor according to a first embodiment of the present invention.

A touch sensor according to a first embodiment of the present invention will be described with reference to the accompanying drawings. As illustrated in FIG. 1, the display device 1 preferably includes a portable housing 100 and operates as a touch input device, for example a tablet or a smartphone.

Figure 2:
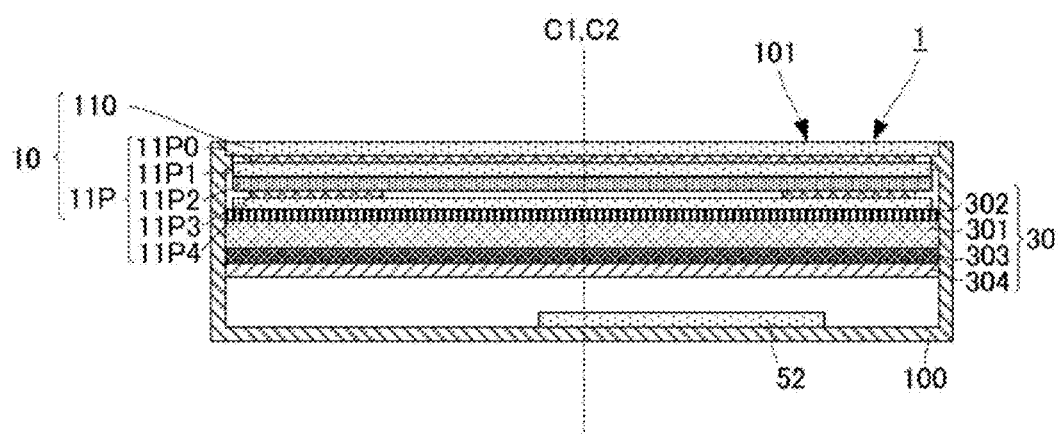
FIG. 2 is a sectional view taken along line S-S illustrated in FIG. 1.
Figure 2:
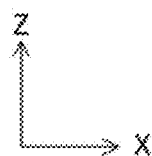

The housing 100 preferably has a rectangular parallelepiped shape whose length and width are larger than its thickness and whose top surface is open. As illustrated in FIGS. 1 and 2, a translucent, insulative input plate 110 is fixed in the opening of the housing 100. An upper surface of the input plate 110 serves as an input surface 110.

Figure 7:
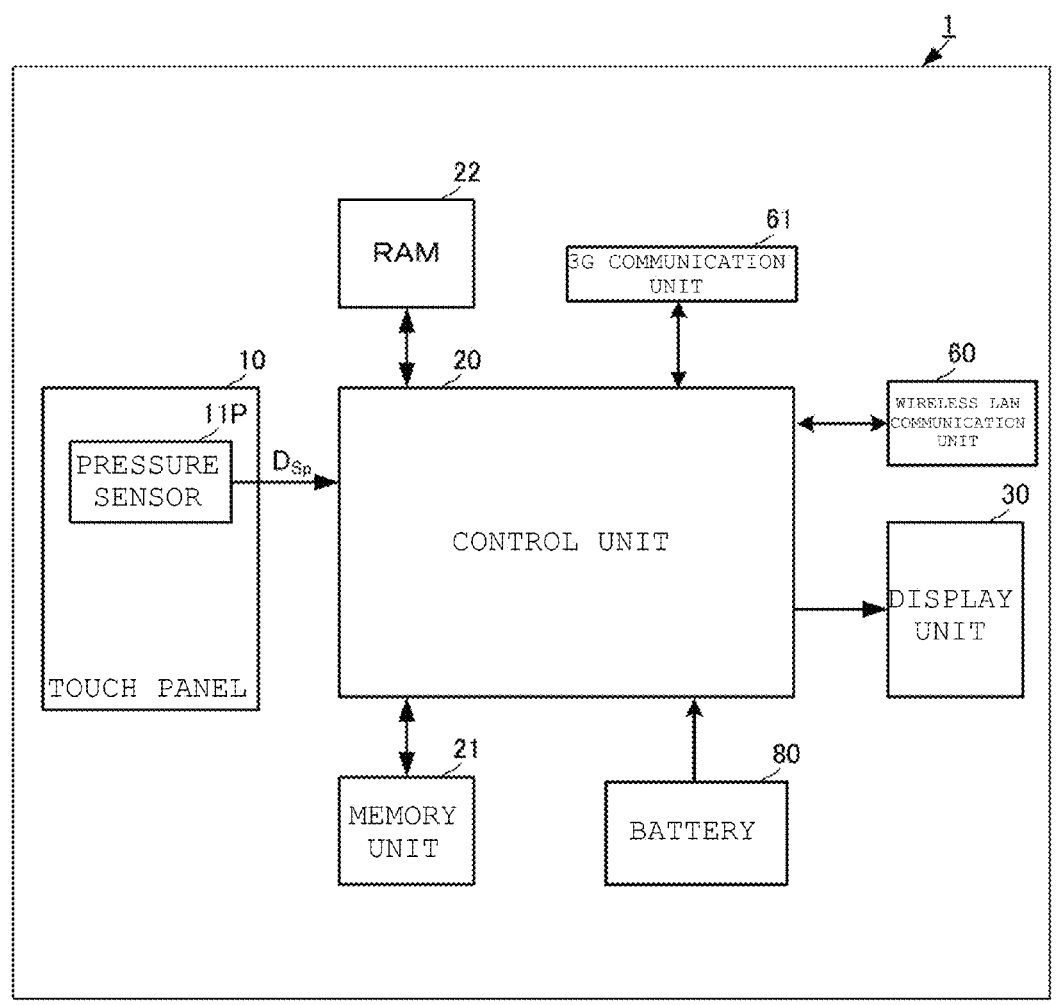
FIG. 7 is a block diagram of the display device 1 illustrated in FIG. 1.

The display device 1 includes, in order from the top of the display device as viewed in FIG. 2, the input plate 110, a pressure sensor 11P, a display unit 30, a control circuit module 52 and a battery 80 (FIG. 7). The input plate 110 and the pressure sensor 11P are combined to form the touch panel 10. The input plate 110, the pressure sensor 11P and the display unit 30 preferably have flat shapes, and flat surfaces of the input plate 110, the pressure sensor 11P and the display unit 30 are arranged in the housing 100 parallel to the input surface 101 of the housing 100.

Figure 8:
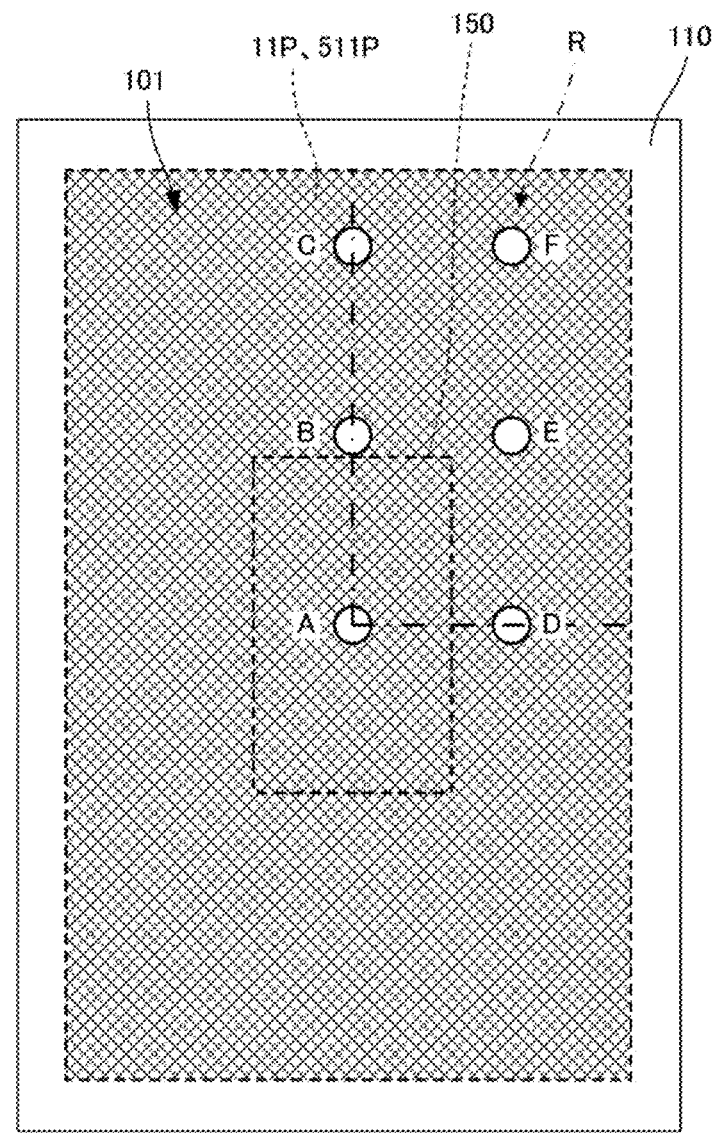
FIG. 8 is a planar perspective view of a touch sensor 11P illustrated in FIG. 2 and a touch sensor 511P according to a comparative example of the first embodiment of the present invention.
Figure 8:
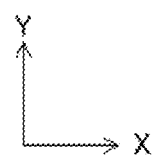

A circuit board (not illustrated) is arranged between a bottom surface of the housing 100 and the display unit 30 and a control circuit module 52 is mounted on the circuit board. The control circuit module 52 includes a control unit 20, a memory unit 21, a RAM 22, a wireless LAN communication unit 60 and a 3G communication unit 61 all of which are illustrated in FIG. 8 and discussed further below.

The control circuit module 52 is connected to the pressure sensor 11P, the display unit 30 and the battery 80. In this regard, the control unit 20 is connected to the pressure sensor 11P.

As illustrated in FIGS. 2 to 6, the pressure sensor 11P includes a piezoelectric detection electrode 11P0, a flat insulating substrate 11P1, a flat base piezoelectric film 11P2, a piezoelectric detection electrode 11P3 and a flat insulating substrate 11P4.

The insulating substrate 11P1 is preferably made of a translucent material such as PET. The insulating substrate 11P1 includes a top surface at the side of the input surface 101 having a piezoelectric detection electrode 11P0 formed thereon, and a bottom surface which opposes the top surface.

The base film 11P2 includes a top surface at the side of the input surface 101, and a bottom surface which opposes to the top surface. The bottom surface of the insulating substrate 11P1 is attached to the top surface of the piezoelectric base film 11P2, preferably by an adhesive.

Figure 3:
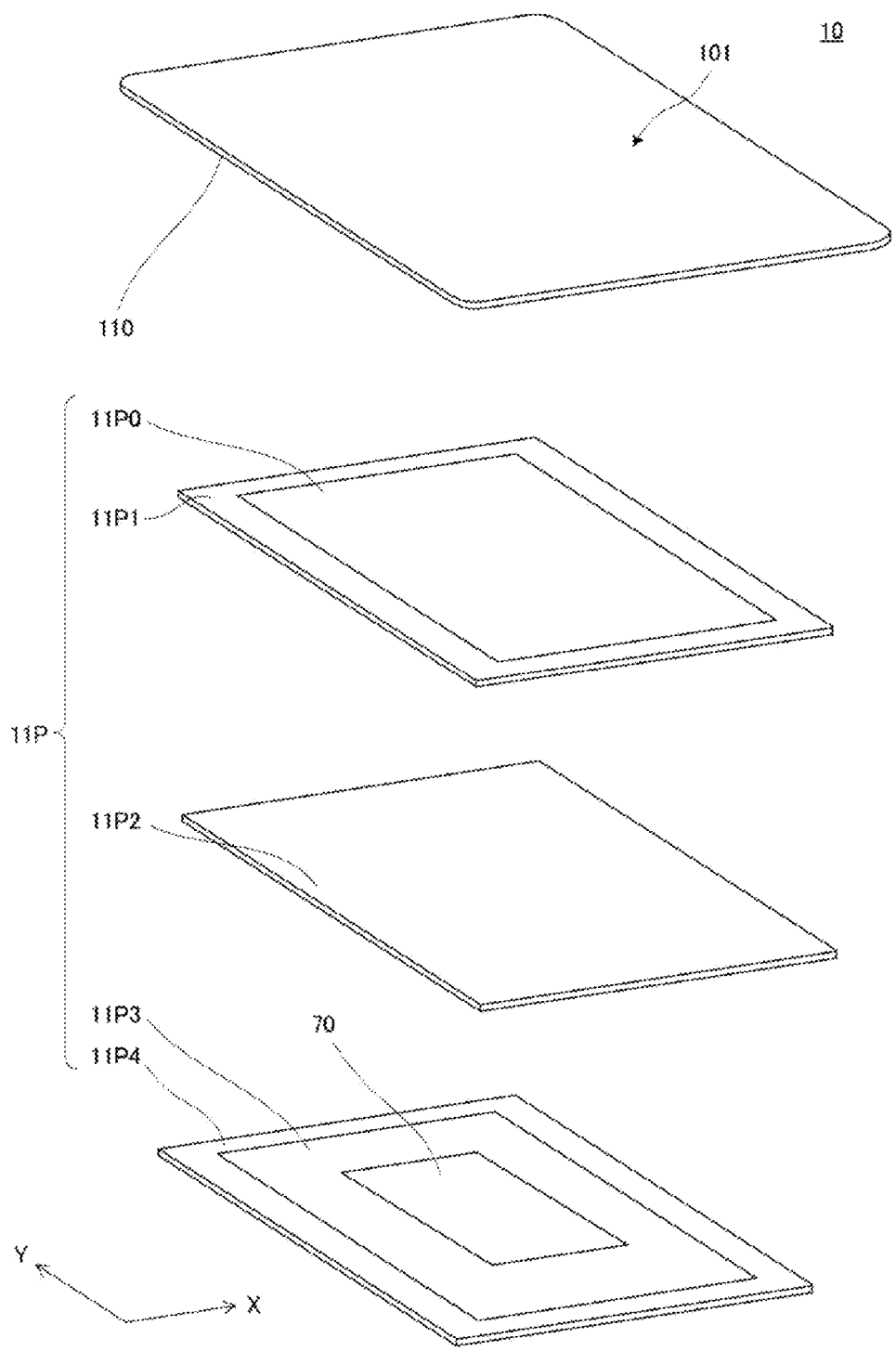
FIG. 3 is an exploded perspective view of a touch panel 10 illustrated in FIG. 2.
Figure 4:
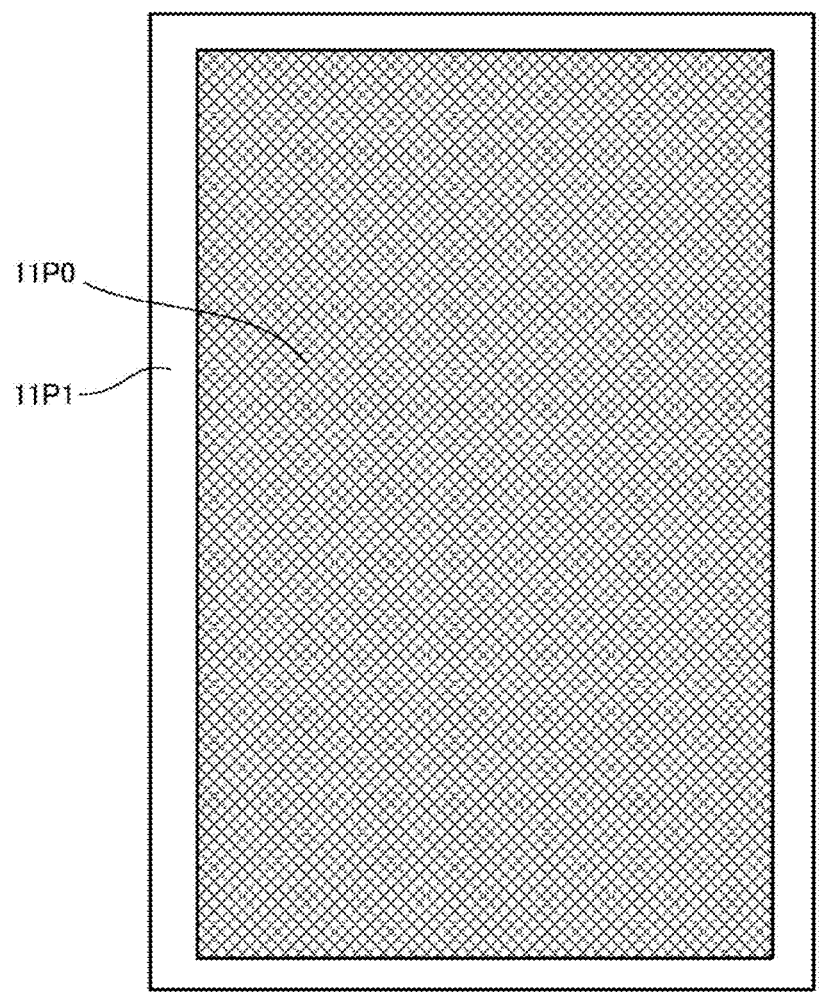
FIG. 4 is a plan view of an insulating substrate 11P1 illustrated in FIG. 2.
Figure 6:
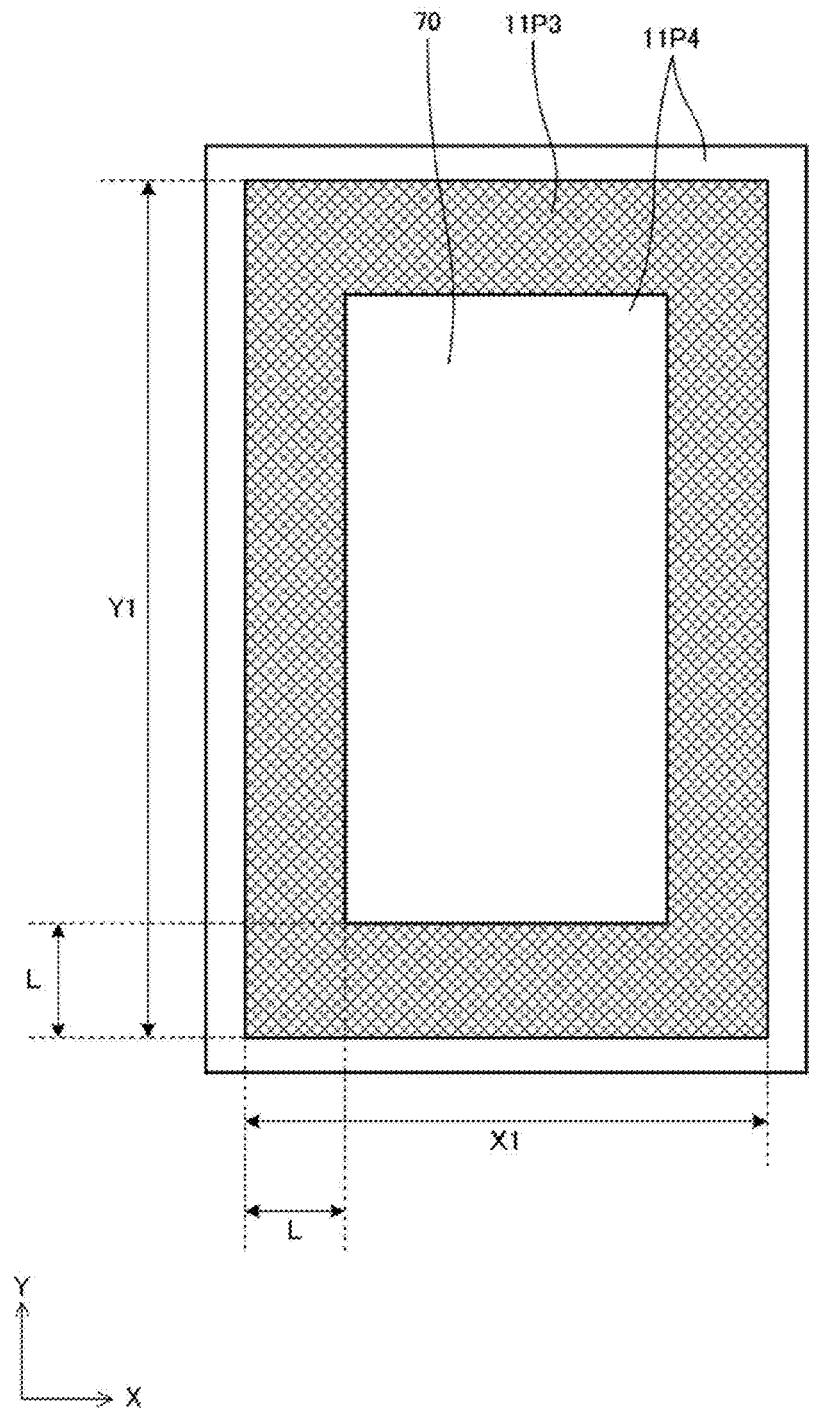
FIG. 6 is a plan view of an insulating substrate 11P4 illustrated in FIG. 2.

As illustrated in FIGS. 3 and 6, the insulating substrate 11P4 is made of a translucent material such as PET. The insulating substrate 11P4 includes a top surface at the side of the input surface 101 on which the piezoelectric detection electrode 11P3 is formed, and a bottom surface which opposes to the top surface. The bottom surface of the base film 11P2 is attached to the top surface of the insulating substrate 11P4, preferably by an adhesive.

The insulating substrate 11P1 and the base film (formed of a material having piezoelectric properties) 11P2 cooperate to define a "piezoelectric film."

According to the above configuration, the pressure sensor 11P includes the piezoelectric film whose opposite flat principal surfaces are provided with the piezoelectric detection electrode 11P0 and the piezoelectric detection electrode 11P3, respectively. Further, when seen from a direction orthogonal to both of these principal surfaces, an opening 70 is provided in a center region of the piezoelectric detection electrode 11P3 provided on at least one of the principal surfaces. The opening 70 (FIG. 3) exposes the insulating substrate 11P4. The opening 70 (that is, the area where the piezoelectric detection electrode is not formed) preferably has a rectangular shape.

By way of example, the longitudinal length Y1 (FIG. 6) of the piezoelectric detection electrode 11P3 is, for example, 125 mm, the lateral length X1 of the piezoelectric detection electrode 11P3 is, for example, 75 mm and the width length L of the piezoelectric detection electrode 11P3 is, for example, 12.5 mm. The center axis of the opening 70 matches the center axis of the base film 11P2.

In the present embodiment, the opening 70 is provided only in the center region of the piezoelectric detection electrode 11P3. However, the present invention is not so limited. For example, a similar opening (i.e., absence of the piezoelectric detection electrodes) may be provided in the center region of the piezoelectric detection electrode 11P0.

By using the piezoelectric detection electrodes 11P0 and 11P3, the pressure sensor 11P detects electric charges produced by deflection of the base film 11P2 when a user presses against the input surface 101 and thereby presses a flat film surface of the base piezoelectric film 11P2. The pressure sensor 11P generates a press detection signal as a function of the pressing force applied to the base film 11P2 and sends that signal to the control circuit module 52 via wiring which is not illustrated.

The base film 11P2 is a film having piezoelectric properties and is preferably made of uniaxially stretched polylactic acid (PLA) and is more preferably made of poly-L-lactic acid (PLLA). The PLLA is preferably chiral polymer and its main chain adopts a spiral structure. The PLLA is uniaxially stretched and has piezoelectric properties when molecules are oriented. The uniaxially stretched PLLA produces an electric charge when the flat film surface of the piezoelectric film is pressed. In this regard, the amount of electric charges to be produced is uniquely determined based on a displacement amount of the flat film surface displaced by a force in a direction orthogonal to the flat film surface. A piezoelectric constant of the uniaxially stretched PLLA is very high among polymers. Consequently, by using PLLA, it is possible to reliably detect displacement caused by a pressing force with a high sensitivity. That is, it is possible to reliably detect the amount of the pressing force with a high sensitivity.

A preferable stretching rate is about 3 to 8 fold. Performing heating processing after the stretching encourages crystallization of extended chain crystal of polylactic acid, and the piezoelectric constant improves. In addition, by varying stretching rates of axes when biaxial stretching is performed, it is possible to obtain the same effect as that of uniaxial stretching.

When, for example, stretching is performed eight times along an X axis direction (FIG. 4) and then two times in a Y axis direction orthogonal to the X axis, it is possible to obtain for the piezoelectric constant a substantially equivalent effect as that of a case where uniaxial stretching is performed four times in the X axis direction. A simply uniaxially stretched film is easily broken along a stretching axis direction, so that it is possible to increase the strength to some degree by performing the above biaxially stretching.

Further, the PLLA produces piezoelectricity as a result of molecule orientation processing such as stretching, and does not require polling processing unlike other polymers such as PVDF or piezoelectric ceramics. That is, piezoelectricity of PLLA which does not belong to ferroelectrics does not appear due to ion polarization as occurs in ferroelectrics such as PVDF or PZT, and derives from a helical structure which is a characteristics structure of molecules.

As a result, the PLLA does not produce pyroelectricity produced in piezoelectric bodies of other ferroelectrics. Further, PVDF or the like shows a fluctuation of a piezoelectric constant over time and the piezoelectric constant is remarkably low depending on cases. However, the piezoelectric constant of PLLA is very stable over time. Consequently, it is possible to detect displacement caused by the application of a pressing force with a high sensitivity without being influenced by the surrounding environment.

Figure 5:
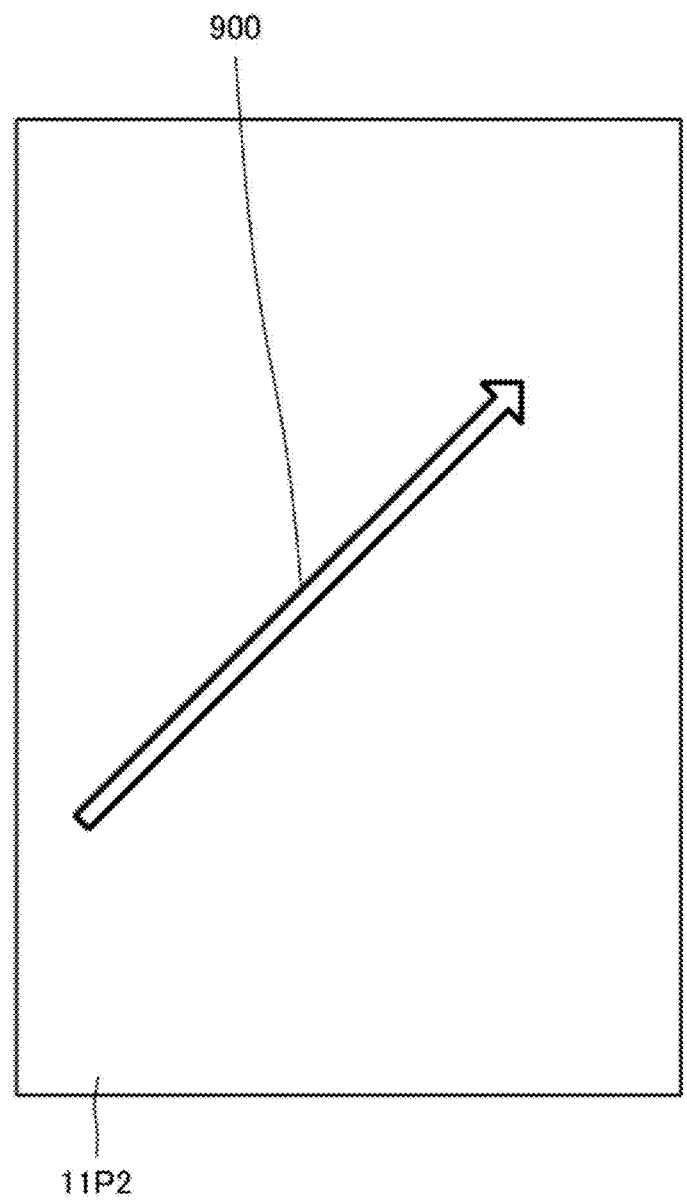
FIG. 5 is a plan view of a base film 11P2 illustrated in FIG. 2.

As illustrated in FIGS. 2, 3 and 5, the uniaxially stretched base film 11P2 is preferably arranged in the housing 100 such that a uniaxial stretching direction 900 (FIG. 5) forms an angle corresponding to nearly 45° in two orthogonal directions along a side surfaces of the housing 100. By providing such an arrangement, it is possible to detect displacement of the film 11P2 in a direction perpendicular to the plane of the input plate 110 (and therefore perpendicular to the plane of the base film 11P2) with a higher sensitivity. Consequently, it is possible to detect a pressing amount with a higher sensitivity.

For the piezoelectric detection electrodes 11P0 and 11P3 illustrated in FIGS. 2 to 4 and 6, it is preferred to use one of organic electrodes whose main components are polythiophene or polyaniline and inorganic electrodes such as ITO, ZnO, silver nanowires, carbon nanotubes or graphene. By using these materials, it is possible to form a conductor pattern exhibiting a high translucency.

As illustrated in FIGS. 1 and 2, the display unit 30 is arranged on the bottom principal surface of the touch panel 10. The display unit 30 is preferably a so-called flat display, and more preferably is formed of a liquid crystal display element.

The display unit 30 includes a liquid crystal panel 301, a top surface polarizing plate 302, a back surface polarizing plate 303 and a backlight 304. The top surface polarizing plate 302 and the back surface polarizing plate 303 are arranged to sandwich the liquid crystal panel 301. The backlight 304 is arranged on a side opposite to the liquid crystal panel 301 across the back surface polarizing plate 303.

As illustrated in FIG. 7, the display device 1 includes the touch panel 10, the control unit 20, a memory unit 21, a RAM 22, the display unit 30, a wireless LAN communication unit 60, a 3G communication unit 61 and a battery 80.

The memory unit 21 is for example, a flash memory. The memory unit 21 stores a control program which causes the control unit to carry out the method described below. The control unit 20 is, for example, a CPU and includes a timer circuit which times a current time and a current date. The control unit 20 controls an input of each of the units of the display device 1 according to the control program stored in the memory unit 21. The control unit 20 stores data processed by the control program in the RAM 22.

The touch panel 10 includes the input plate 110 and the pressure sensor 11P. When the input surface 101 is pressed, the pressure sensor 11P generates a press detection signal $D_{Sp}$ whose value corresponds to a pressing amount (pressing force) applied to the input surface 101 and sends it to the control unit 20.

The control unit 20 determines input contents based on the press detection signal. In this regard, the control unit 20 uses the memory unit 21 as a memory region for processing of determining input input contents. The control unit 20 generates image data based on the determined input input contents and outputs the image data to the display unit 30. The display unit 30 displays an image on the input surface 101 based on the image data.

The wireless LAN communication unit 60 and the 3G communication unit 61 include antennas (not illustrated). The wireless LAN communication unit 60 performs communication with a server device (not illustrated) via a wireless LAN router connected to the Internet. The 3G communication unit 61 performs communication with the server device (not illustrated) via a base station connected to a mobile telephone network. The battery 80 supplies a DC operating power to each unit of the display device 1.

The pressure sensor 11P (touch sensor 11P) according to the foregoing embodiment of the present invention, and a touch sensor 511P according to a comparative example will now be compared. First, a configuration of the comparative touch sensor 511P will be described.

Figure 9:
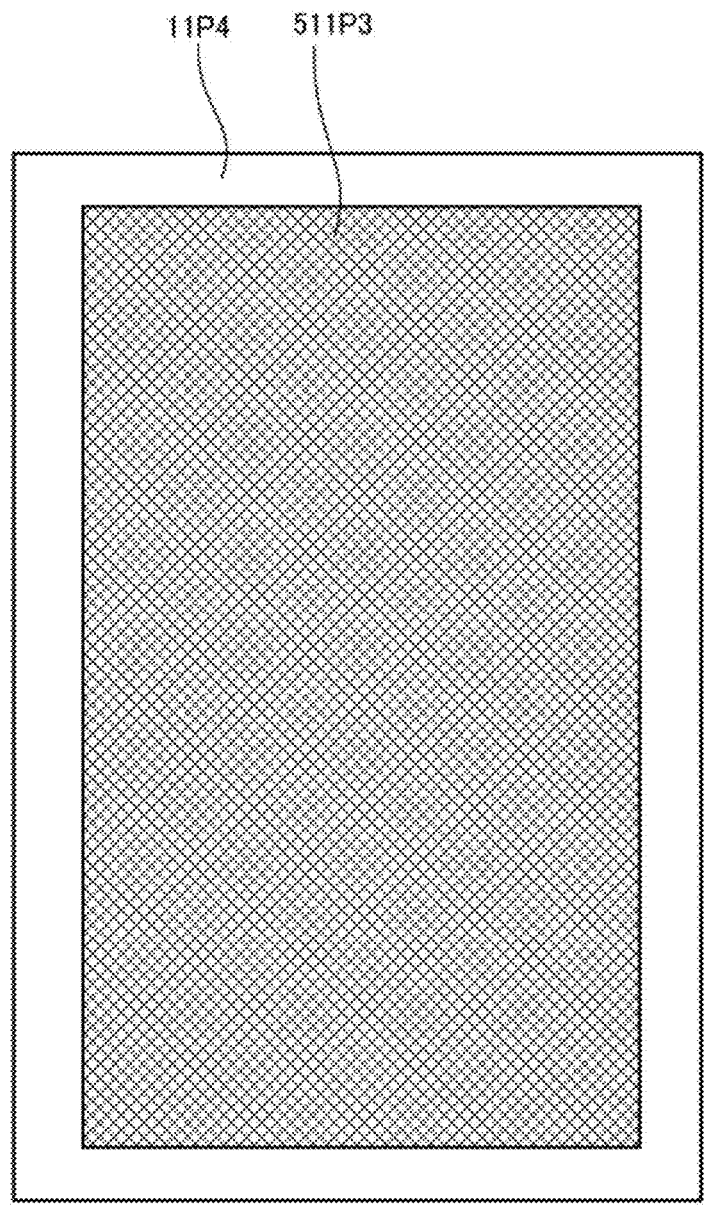
FIG. 9 is a plan view of the insulating substrate 11P4 of the touch sensor 511P illustrated in FIG. 8.

FIG. 8 is a planar perspective view of the touch sensor 11P illustrated in FIG. 2 but modified according to the comparative example. FIG. 9 is a plan view of the insulating substrate 11P4 of the comparative touch sensor 511P illustrated in FIG. 8.

As illustrated in FIGS. 8 and 9, the comparative touch sensor 511P differs from the touch sensor 11P in that the opening 70 is not included in a center region of a piezoelectric detection electrode 511P3. The remaining components are the same, and therefore will not be described.

Figure 10A:
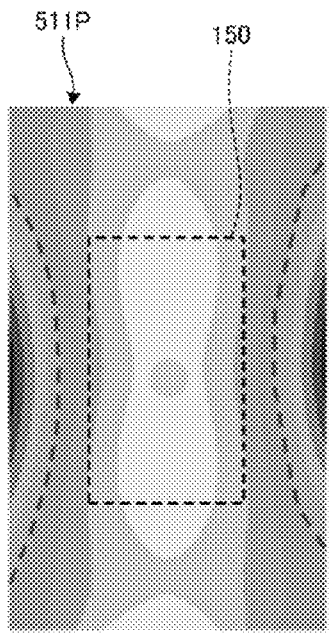
FIGS. 10(A) through 10(F) are views of electric charges produced as a function of the touch positions (A) to (F) on the touch sensor 511P illustrated in FIG. 8.
Figure 10B:
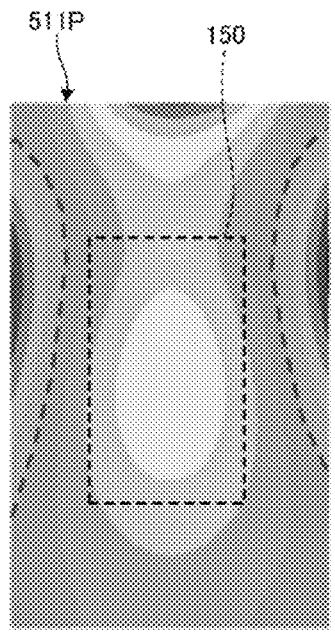
Figure 10C:
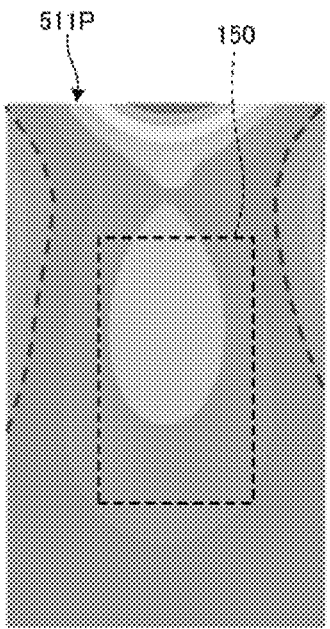
Figure 10D:
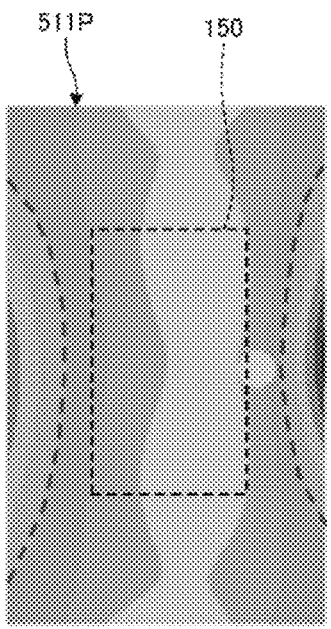
Figure 10E:
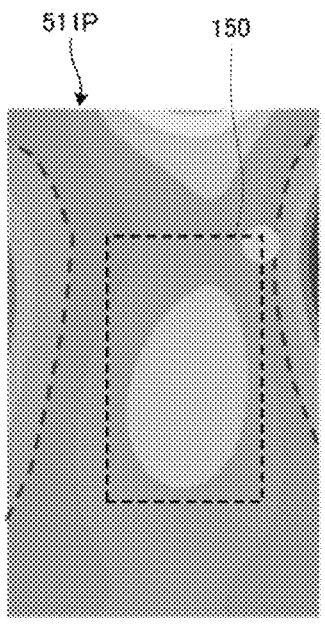
Figure 10F:
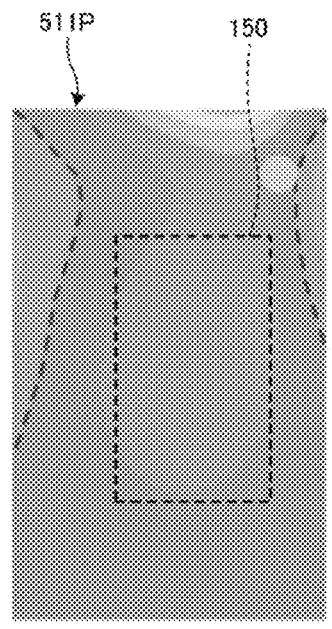
Figure 11:
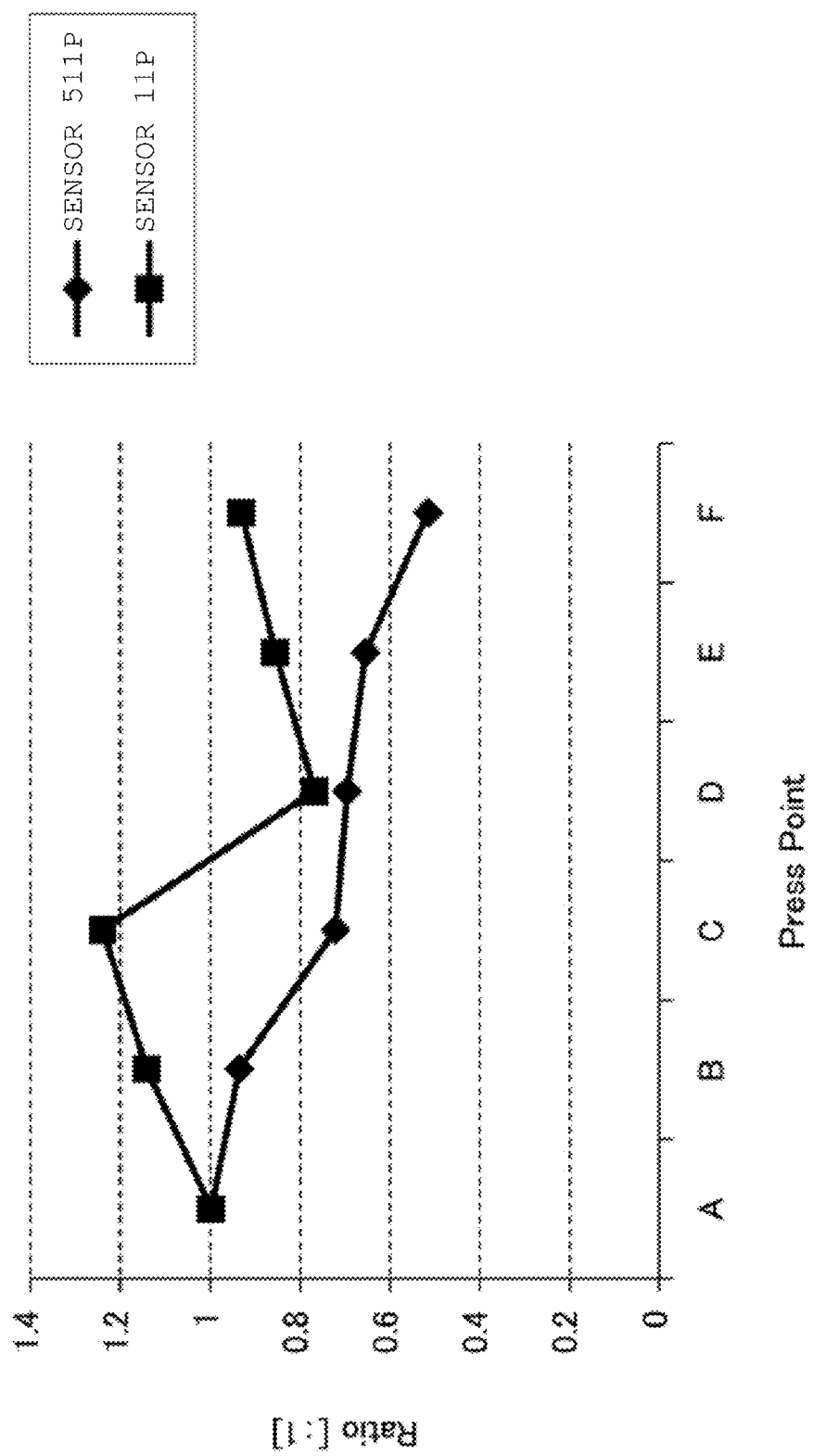
FIG. 11 is a view illustrating a relationship between the pressing positions A to F, and a ratio of an output of each of the pressing positions B to F with respect to an output of the pressing position A on the touch sensor 11P illustrated in FIG. 2 and the touch sensor 511P illustrated in FIG. 8.

A result obtained by simulating electric charges produced in the touch sensor 11P and electric charges produced in the comparative touch sensor 511P when different positions on the input surface 101 are pressed as illustrated in FIGS. 10 to 12 will now be described. The electric charges produced in the touch sensor 511P were simulated by replacing the touch sensor 11P in the display device 1 with the touch sensor 511P.

The simulation was conducted under the following dimension conditions as illustrated in FIG. 8. A longitudinal length (Y direction) of the input plate 110 was 143.5 mm and a lateral length (X direction) of the input plate 110 was 81.5 mm. Further, an interval between the pressing positions A and B, pressing positions B and C, pressing positions D and E and pressing positions E and F were all 25 mm. Further, an interval between the pressing positions A and D, pressing positions B and E, and pressing positions C and F were all 20 mm. Further, vertical lengths of the touch sensor 11P and the comparative touch sensor 511P were 125 mm, and lateral lengths of the touch sensor 11P and the comparative touch sensor 511P were 75 mm.

FIGS. 10(A) through 10(F) are respective views showing the electric charges produced when the pressing positions (A) through (F), respectively, were pressed on the comparative touch sensor 511P illustrated in FIG. 8. As illustrated in FIG. 10(A), when the pressing position was at the center of the touch sensor 511P, stress was uniformly applied to the upper and lower end portions of the touch sensor 511P, and therefore the so produced electric charges were uniform.

Next, it was found that, as illustrated in FIGS. 10(B) and (C), when the pressing position moved in a Y direction to positions B and C, the stress applied to the upper end portion of the touch sensor 511P near the pressing position became great and the resulting electric charges at the upper end portion of the center became great. In contrast, the stress at the lower end portion of the sensor, distant from the pressing positions B and C became small and the resulting electric charges at the lower end portion became small. The produced electric charges at the upper and lower end portions of the sensor offset one another and a sum of the electric charges produced at the upper and lower end portions of the sensor when the pressing position was B or C, did not change much compared to a sum of the electric charges produced at the upper and lower end portions of the pressing position A before the movement.

Next, it was found that, as illustrated in FIGS. 10(D), (E) and (F), when the pressing position moved in an X direction, the stress applied to a right end portion of the comparative touch sensor 511P near the pressing position became great and the resultant electric charge at the right end portion became great. In contrast, the stress at a left end portion distant from the pressing position, became small and the resulting electric charge at the left end portion became small. Hence, it was found that the produced electric charges complement each other at the left and right end portions, and a sum of the produced electric charges at the left and right end portions of the pressing position D, E or F after the movement did not change much compared to a sum of the produced electric charges at the left and right end portions of the pressing position A, B or C before the movement.

It was also found that, as illustrated in FIGS. 10(A) to (F), in a center region 150 of the comparative touch sensor 511P, the stress significantly changed as a function of the pressing position and therefore the resultant electric charge significantly changed.

FIG. 11 is a chart illustrating a relationship between the pressing positions A to F and a ratio of an output of each of the pressing positions B to F with respect to an output of the pressing position A on the touch sensor 11P illustrated in FIG. 2 and the comparative touch sensor 511P illustrated in FIG. 8. As can be seen, in case of the comparative touch sensor 511P, the output decreased by 48% at the pressing position F (the position of the largest variation). In contrast, this decrease was reduced to 22% at the pressing position D in the inventive touch sensor 11P. It was also found that uniformity ((MAX−MIN)/(MAX+MIN)×100) of the touch sensor 511P was 32% and the uniformity of the touch sensor 11P was 23%.

Figure 12B:
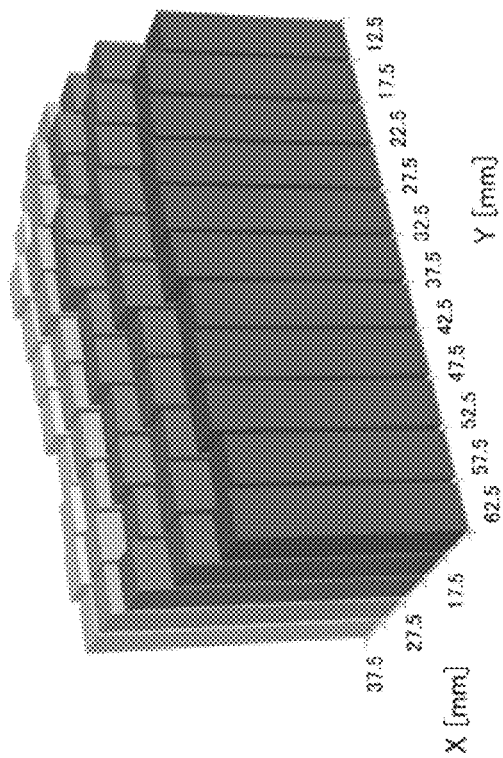
FIG. 12(B) is a view illustrating an electric charge produced when each pressing position of the ¼ rectangular region R of the touch sensor 11P illustrated in FIG. 2 is pressed.
Figure 12A:
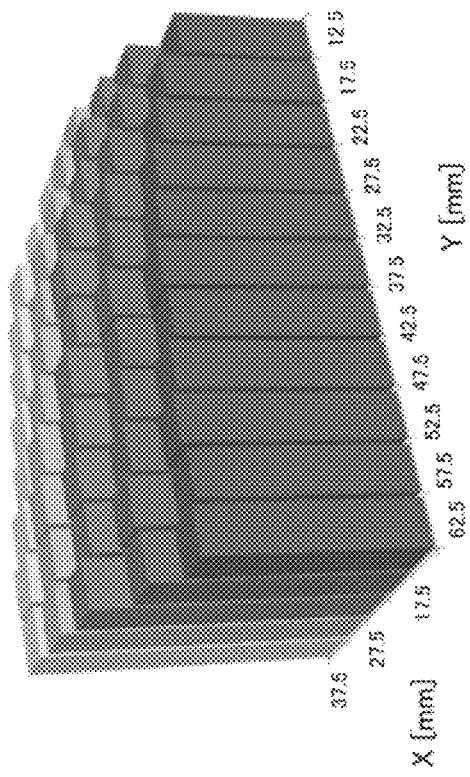
FIG. 12(A) is a view illustrating an electric charge produced when each pressing position of a ¼ rectangular region R of the touch sensor 511P illustrated in FIG. 8 is pressed.

FIG. 12(A) is a view illustrating electric charges produced when each pressing position of a ¼ rectangular region R of the comparative touch sensor 511P illustrated in FIG. 8 is pressed. FIG. 12(B) is a view illustrating an electric charge produced when each pressing position of the ¼ rectangular region R of the touch sensor 11P illustrated in FIG. 2 is pressed. The ¼ rectangular region R refers to a region obtained by dividing one principal surface of the touch sensor 11P or the comparative touch sensor 511P by four equal areas around the center axis C2 (FIG. 2).

It was found that, while the electric charges produced by the comparative touch sensor 511P (for a constant pressing force) decreased as the pressing position moved from the center portion to an end portion, the inventive touch sensor 11P suppressed this tendency.

In view of the foregoing, it was found that the touch sensor 11P including the opening 70 in the center region 150 of the piezoelectric detection electrode 11P3 prevents (or at least mitigates) an output from varying depending on the pressing position compared to the comparative touch sensor 511P which does not include the opening 70.

One reason why the above result was obtained is that the touch sensor 11P eliminates electric charges which vary significantly as a function of the pressing position in the center region 150, and instead relies on the electric charges which vary less as a function of the pressing position and are produced from the peripheral region surrounding the opening 70.

Consequently, the touch sensor 11P employing this configuration can prevent, or at least reduce, an output from varying as a function of the pressing position. As a result, the touch sensor 11P employing this configuration can stabilize its output. Because the output is more stable, the display device 1 including the touch sensor 11P employing this configuration does not need to correct its output as a function of the pressing position thereby simplifying the required processing of the output signal.

Figure 13:
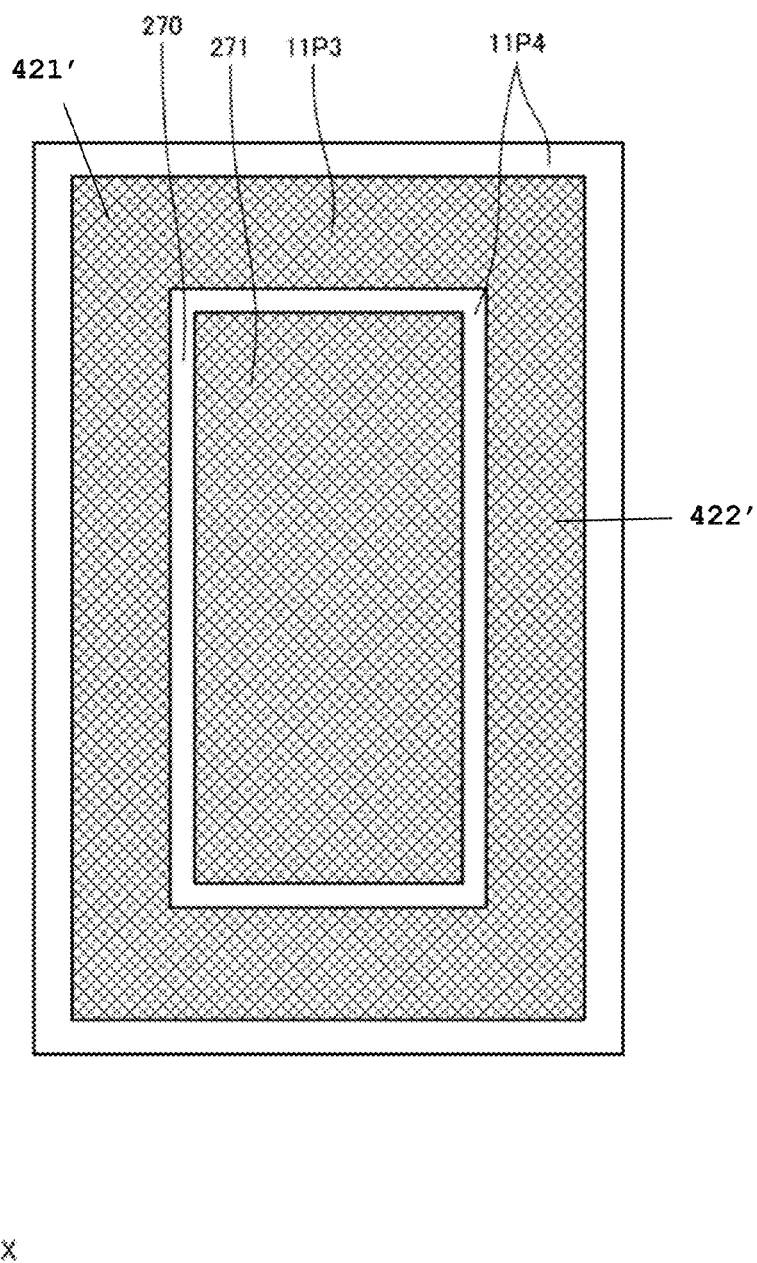
FIG. 13 is a plan view of the insulating substrate 11P4 of a touch sensor according to a second embodiment of the present invention.

Next, a touch sensor according to a second embodiment of the present invention will be described with reference to FIG. 13. The touch sensor according to the present embodiment differs from the touch sensor 11P according to the first embodiment in that an internal electrode 271 exists in the center region but is insulated from a piezoelectric detection electrode 11P3 by a frame shaped opening 270. The other components are the same, and therefore will not be described.

In the touch sensor according to the present embodiment, the number of laminated electrodes in the center region 150 and in a surrounding region positioned closer to an outer circumference of the sensor is similar (e.g., within _____ percent) with the result that the touch sensor according to the present embodiment can prevent occurrence of optical unevenness.

If a potential of the internal electrode 271 is a floating potential, the influence of an electric field between the internal electrode 271 and a piezoelectric detection electrode 11P0 charges electric charges which can be taken from the piezoelectric detection electrode 11P3. To avoid this change, the internal electrode 271 preferably has the same potential as that of the piezoelectric detection electrode 11P3.

Figure 14:
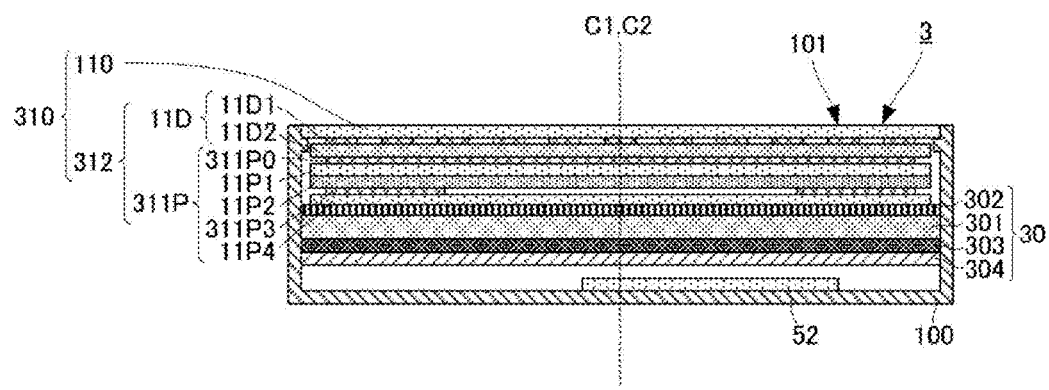
FIG. 14 is a sectional view of a display device 3 which includes a touch sensor 312 according to a third embodiment of the present invention.
Figure 14:
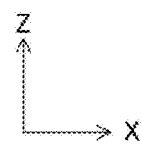

Next, a touch sensor according to a third embodiment of the present invention will be described with reference to FIGS. 14-17. FIG. 14 shows a display device 3 which includes a touch sensor 312 which differs from the touch sensor 11P according to the first embodiment in that it also includes a capacitive position sensor 11D and that piezoelectric detection electrodes 311P0 and 311P3 have shapes which are different than those of the piezoelectric detection electrodes 11P0 and 11P3. The other components are the same, and therefore will not be described.

In the display device 3 according to the present embodiment, the touch panel 310 includes an input plate 110, a pressure sensor 311P and a capacitive position sensor 11D. In this embodiment, the pressure sensor 311P and the capacitive position sensor 11D together compose the touch sensor 312.

The control circuit module 52 is connected to the capacitive position sensor 11D, the pressure sensor 311P, a display unit 30 and a battery 80. A control unit 20 (FIG. 18) is connected to both the capacitive sensor 11D and the pressure sensor 311P.

Figure 15:
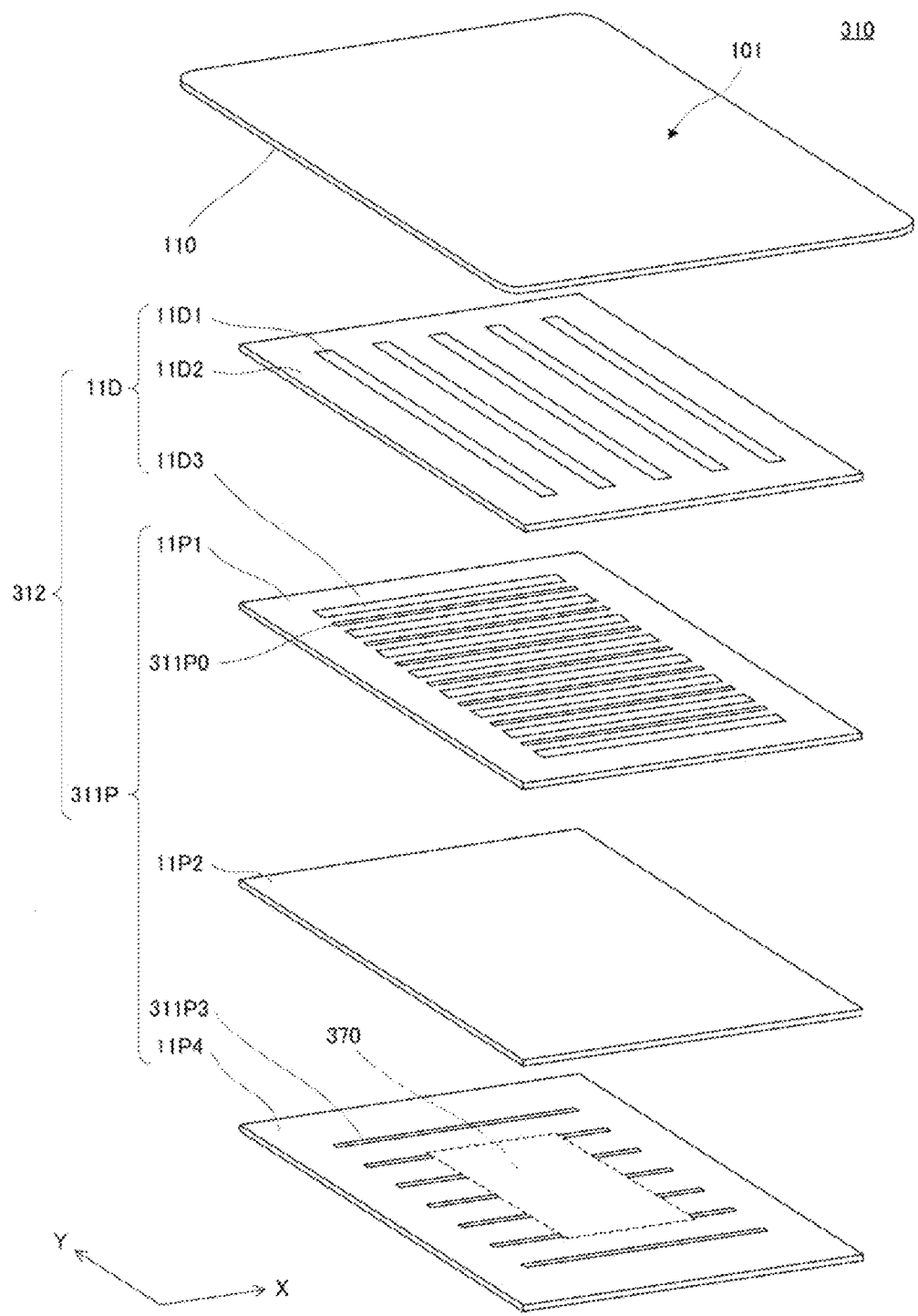
FIG. 15 is an exploded perspective view of a touch panel 310 illustrated in FIG. 14.
Figure 16:
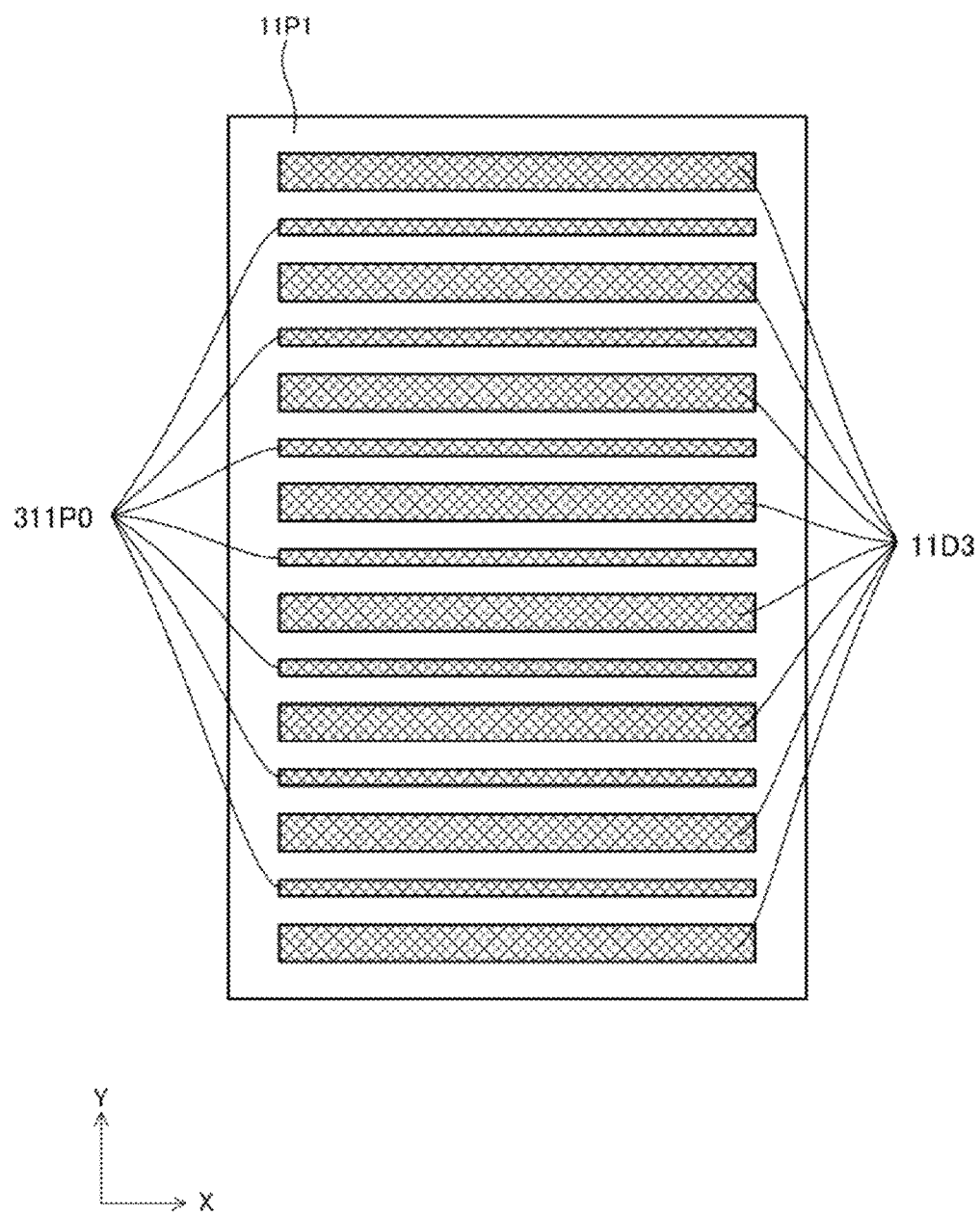
FIG. 16 is a plan view of an insulating substrate 11P1 illustrated in FIG. 14.

As illustrated in FIGS. 14 to 16, the capacitive position sensor 11D includes a plurality of capacitance detection electrodes 11D1, a flat insulating substrate 11D2 and a plurality of capacitance detection electrodes 11D3. The plurality of capacitance detection electrodes 11D1 operate as reception electrodes, and the plurality of capacitance detection electrodes 11D3 operate as transmission electrodes.

The insulating substrate 11D2 is preferably made of a translucent material (e.g. PET). As illustrated in FIG. 15, the insulating substrate 11D2 includes a top surface at a side of an input surface 101 at which the plurality of capacitance detection electrodes 11D1 are formed, and a bottom surface which opposes to the top surface.

The plurality of capacitance detection electrodes 11D1 preferably each have an elongated shape whose elongation direction is along the first direction. The plurality of capacitance detection electrodes 11D1 are preferably arranged at intervals along a second direction orthogonal to the first direction. The plurality of capacitance detection electrodes 11D1 are preferably made of translucent materials.

The insulating substrate 11P1 includes a top surface at the side of the input surface 101 at which the plurality of capacitance detection electrodes 11D3 and the plurality of piezoelectric detection electrodes 311P0 are formed, and a bottom surface which opposes to the top surface. To the top surface of the insulating substrate 11P1 is preferably attached to the bottom surface of the insulating substrate 11D2 by an adhesive.

The plurality of capacitance detection electrodes 11D3 preferably each have an elongated shape whose elongation direction is along the second direction. The plurality of piezoelectric detection electrodes 311P0 preferably each have an elongated shape whose elongation direction is along the second direction.

The plurality of capacitance detection electrodes 11D3 and the plurality of piezoelectric detection electrodes 311P0 are alternately arranged on the same surface of insulating substrate 11P1 at intervals along the first direction (See FIG. 16). The plurality of capacitance detection electrodes 11D3 and the plurality of piezoelectric detection electrodes 311P0 are preferably made of translucent materials.

By using the capacitance detection electrodes 11D1 and 11D3, the capacitive sensor 11D detects a change in a capacitance produced when a user's finger approaches or touches the input surface 101. Further, the capacitive position sensor 11D generates an input detection signal as a function of the detected capacitance change. This signal is sent to the control circuit module 52 via a wiring (not illustrated).

Figure 17:
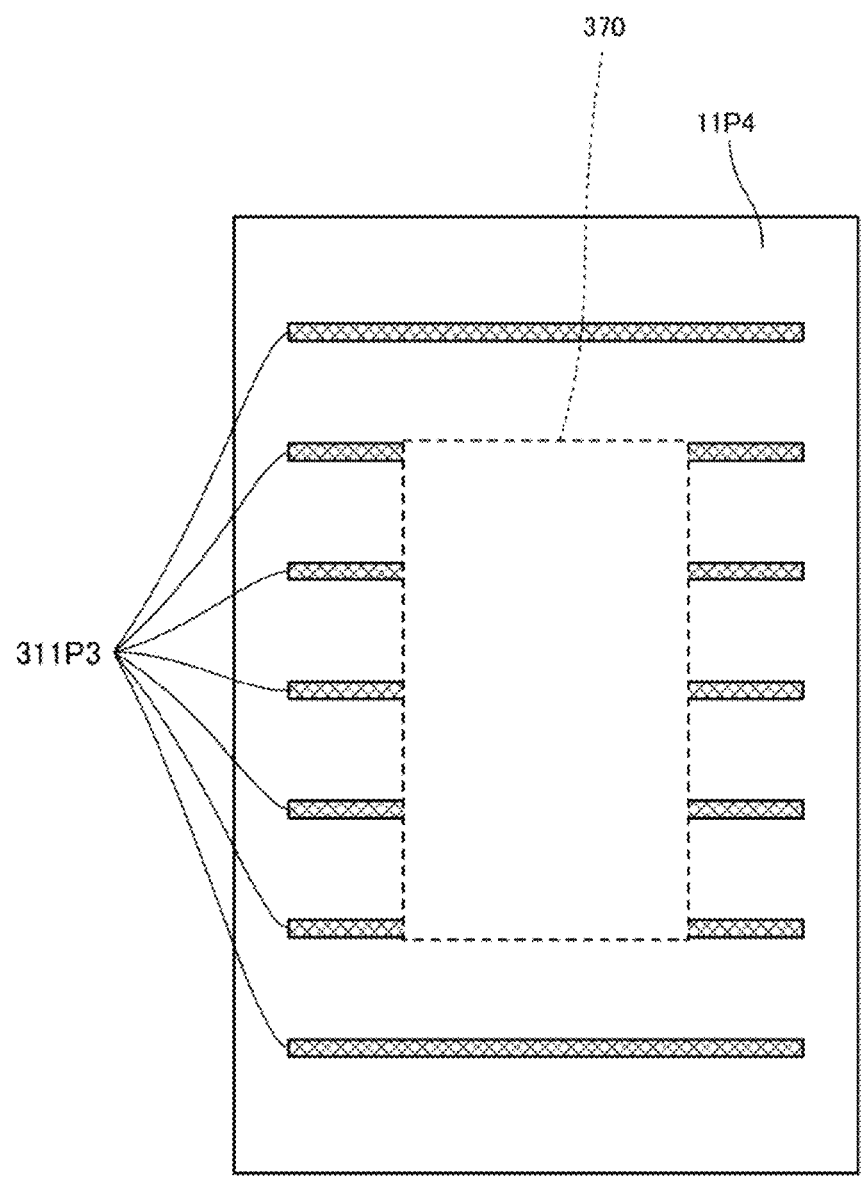
FIG. 17 is a plan view of an insulating substrate 11P4 illustrated in FIG. 14.

As illustrated in FIG. 17, the insulating substrate 11P4 includes a top surface at the side of the input surface 101 on which the plurality of piezoelectric detection electrodes 311P3 are formed, and a bottom surface which opposes to the top surface. The bottom surface of the piezoelectric base film 11P2 is preferably attached to the top surface of the insulating substrate 11P4 by an adhesive.

The plurality of piezoelectric detection electrodes 311P3 preferably have an elongated shape whose elongation direction is along the second direction. The plurality of piezoelectric detection electrodes 311P3 are preferably arranged at positions at which oppose respective ones of the plurality of piezoelectric detection electrodes 311P0 and do not oppose to the plurality of capacitance detection electrodes 11D3.

By using the piezoelectric detection electrodes 311P0 and 311P3, the pressure sensor 311P detects electric charges produced by a deflection of the piezoelectric base film 11P2 when a user pushes down on the input surface 101 and presses a flat film surface of the base film 11P2. Further, the pressure sensor 311P generates a press detection signal as a function of the so produced electric charges. The press detection signal is sent to the control circuit module 52 via a wiring (not illustrated).

In the present embodiment the insulating substrate 11P1 and the piezoelectric base film 11P2 compose a "piezoelectric film." A piezoelectric detection electrode 311P0 is arranged adjacent the upper principal surface of the piezoelectric film and a piezoelectric detection electrode 311 is arranged adjacent to the lower principal surface of the piezoelectric film. Further, when seen from a direction orthogonal to these principal surfaces, a rectangular opening 370 is provided in a center region 150 of the piezoelectric detection electrode 311P3 such that a center axis of the opening 370 matches a center axis of the base film 11P2. Because of the opening 370, the insulating substrate 11P4 is exposed.

Figure 18:
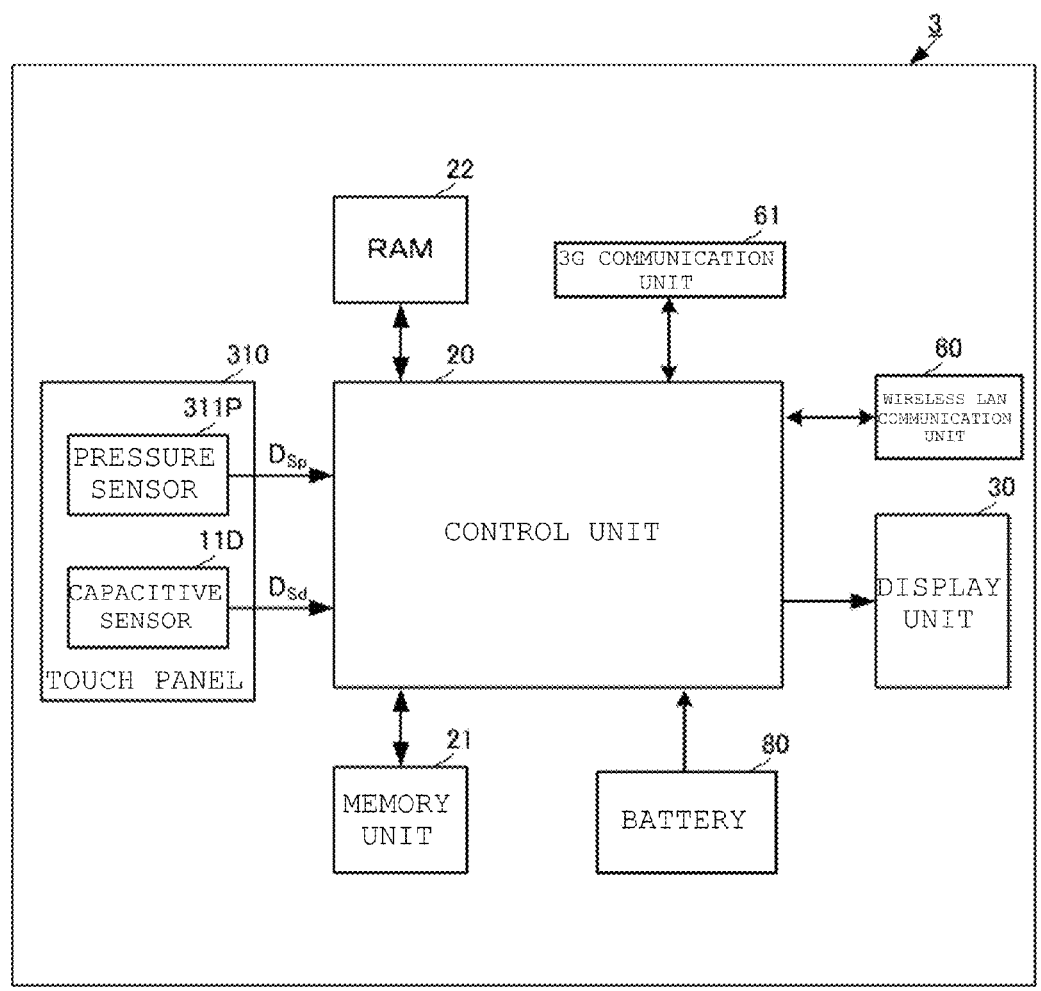
FIG. 18 is a block diagram of the display device 3 illustrated in FIG. 14.

Next, as illustrated in FIG. 18, the capacitive sensor 11D generates an input detection signal $D_{Sd}$ indicating a value of a detected capacitance of each electrode of the touch panel 310. The magnitude of the input detection signal $D_{Sd}$ depends on a change amount of the capacitance produced when a user's finger approaches or touches the input surface 101. The capacitive position sensor 11D outputs the input detection signal $D_{Sd}$ to control unit 20.

When the input detection signal $D_{Sd}$ is larger than a predetermined threshold, the control unit 20 obtains an input position from this input detection signal. The control unit 20 determines input input contents based on both the press detection signal $D_{Sp}$ and the input detection signal $D_{Sd}$.

The pressure sensor 311P does not rely on electric charges produced in the center region 370 (and which vary significantly depending on a pressing position) and instead relies on the electric charges produced from a surrounding peripheral region of the piezoelectric detection electrode 311P3 (and which vary less as a function of the pressing position).

Consequently, the touch sensor 312 according to the present embodiment can prevent, or at least minimize, the output from varying as a function of the pressing position. As a result, the touch sensor 312 according to the present embodiment can stabilize an output. Further, the display device 3 including the touch sensor 312 according to the present embodiment does not need to correct an output depending on the pressing position, and can simplify processing.

Furthermore, the plurality of piezoelectric detection electrodes 311P3 (FIG. 15) are preferably arranged at positions at which oppose the piezoelectric detection electrodes 311P0 but do not oppose the capacitance detection electrodes 11D3. Hence, the pressure sensor 311P can suppress capacitive coupling to the plurality of capacitance detection electrodes 11D3. Consequently, the pressure sensor 311P can reduce noise from the plurality of capacitance detection electrodes 11D3.

Next, a touch sensor according to a fourth embodiment of the present invention will be described with reference to FIGS. 19-20. The touch sensor according to the present embodiment differs from a touch sensor 11P according to the first embodiment in that a piezoelectric detection electrode 411P3 includes upper and lower lateral electrode sections 421, 421' which are formed along the top and bottom lateral sides of a principal surface of the insulating substrate 11P4 facing the input surface 101, and left and right longitudinal electrode units 422, 422' which are formed along the left and right edges of the principal surface. Both electrode sections 421, 421' have a rectangular shape and are formed on the upper and lower sides of the rectangular shaped opening 470. Both electrode sections 422, 422' have a rectangular shape and are formed on opposite lateral sides of the rectangular opening 470. The other components are the same, and therefore will not be described.

Next, a relationship between a width Ly of the upper and lower electrode units 421, 421' and a width Lx of the left and right electrode units 422, 422' will be described. FIG. 20 is a view illustrating a relationship between a ratio of the width Ly of the upper and lower electrode units 421, 421' with respect to the width Lx of the left and right electrode units 422, 422' illustrated in FIG. 19, and a ratio of uniformity. FIG. 20 illustrates a result obtained by preparing four touch sensors including the piezoelectric detection electrode 411P3 and the insulating substrate 11P4 whose Ly/Lx has been changed, and performing calculation by simulating uniformity from electric charges produced in each touch sensor when a pressing force is applied to each pressing position (see FIG. 8) on the input surface 101. This simulation was conducted by replacing the touch sensor 11P in the display device 1 with each touch sensor.

As described above, the uniformity is calculated according to an equation of uniformity=((MAX−MIN)/(MAX+MIN)×100). Further, a ratio (vertical axis) of the uniformity illustrated in FIG. 20 indicates a value in case of Ly/Lx=1, i.e., the uniformity takes 1 when the width Ly of the first electrode unit 421 and the width Lx of the second electrode unit 422 are equal.

Figure 20:
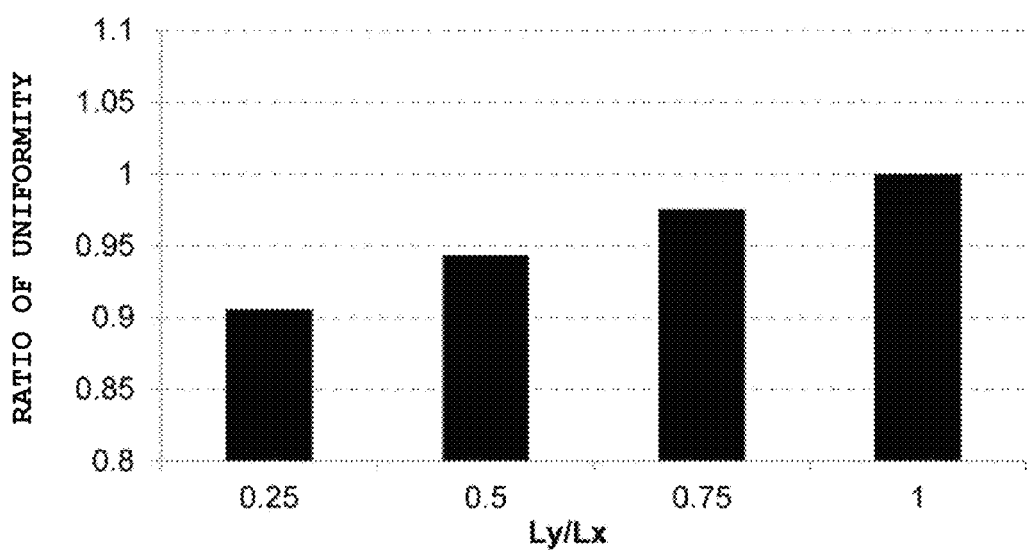
FIG. 20 is a view illustrating a relationship between a ratio of a width Ly of a first electrode unit 421 with respect to a width Lx of a second electrode unit 422 illustrated in FIG. 19, and a ratio of uniformity.

It was found from FIG. 20 that, as Ly became smaller than Lx, the uniformity was improved. That is, it was found that, as Ly became smaller than Lx, a variation of an output became less.

In this regard, when a uniaxial stretching direction of the base piezoelectric film 11P2 is nearly 45°, electric charges produced in the base piezoelectric film 11P2 are proportional to Tx-Ty when X direction and Y direction stresses are Tx and Ty, respectively. At upper and lower end portions of the base film 11P2, the X direction stress becomes dominant compared to the Y direction stress. Hence, more electric charges are produced at the upper and lower end portions of the base film 11P2 than at left and right end portions of the base film 11P2. That is, a change in an output which occurs depending on a pressing position is greater at the upper and lower end portions than at the left and right end portions (all as viewed in FIG. 19).

In view of the above, a reason why the result illustrated in FIG. 20 was obtained is that, by making Ly smaller than Lx, an influence at the upper and lower end portions (at which the change in the output as a function of the pressing position is great) becomes less.

Figure 19:
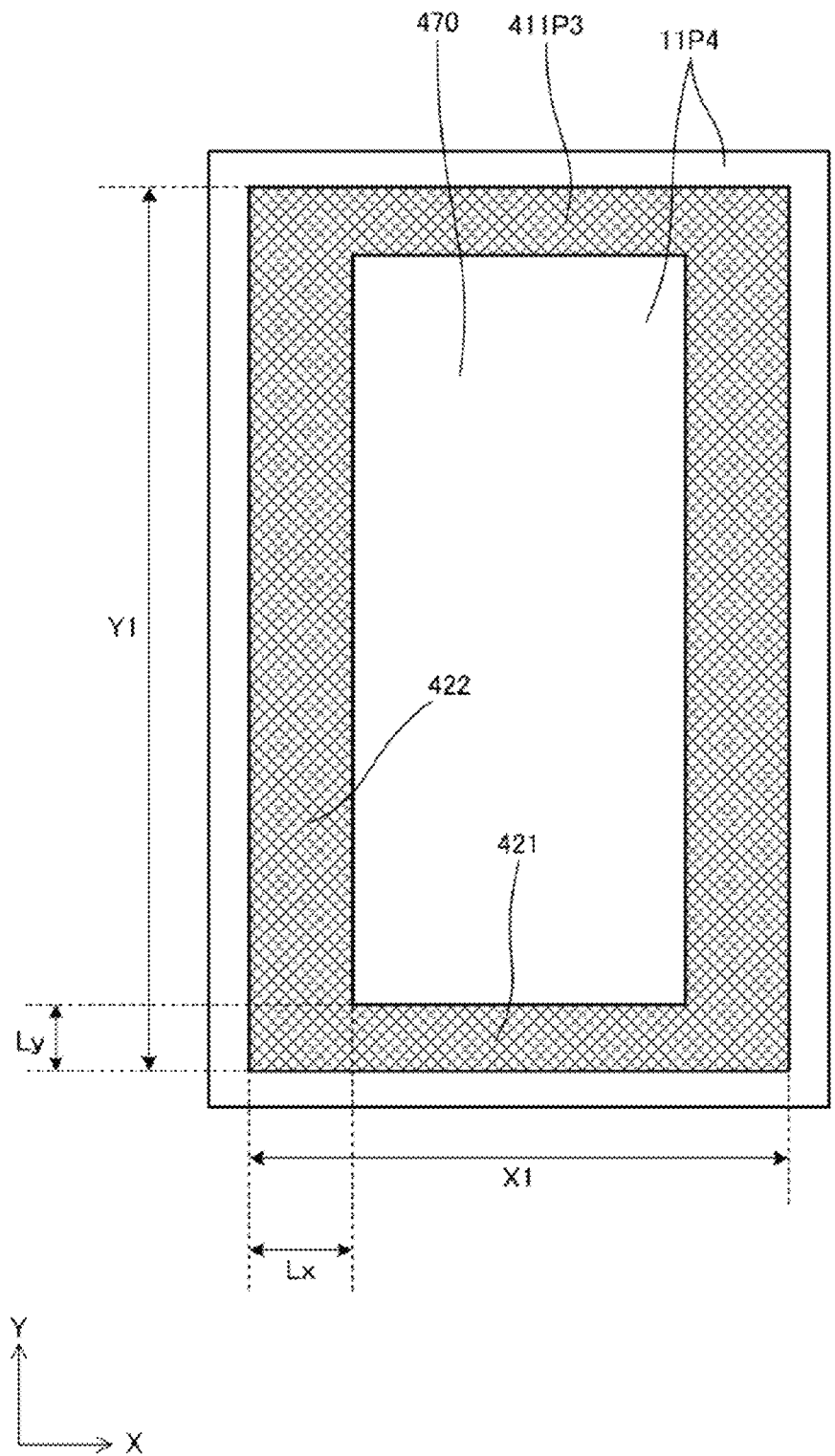
FIG. 19 is a plan view of an insulating substrate 11P4 of a touch sensor according to a fourth embodiment of the present invention.

Consequently, the touch sensor according to the fourth embodiment can further suppress a variation of an output which occurs depending on a pressing position compared to the touch sensor 11P, by making Ly smaller than Lx as illustrated in FIG. 19. That is, the touch sensor according to the fourth embodiment can further stabilize the output compared to the touch sensor 11P.

Figure 21:
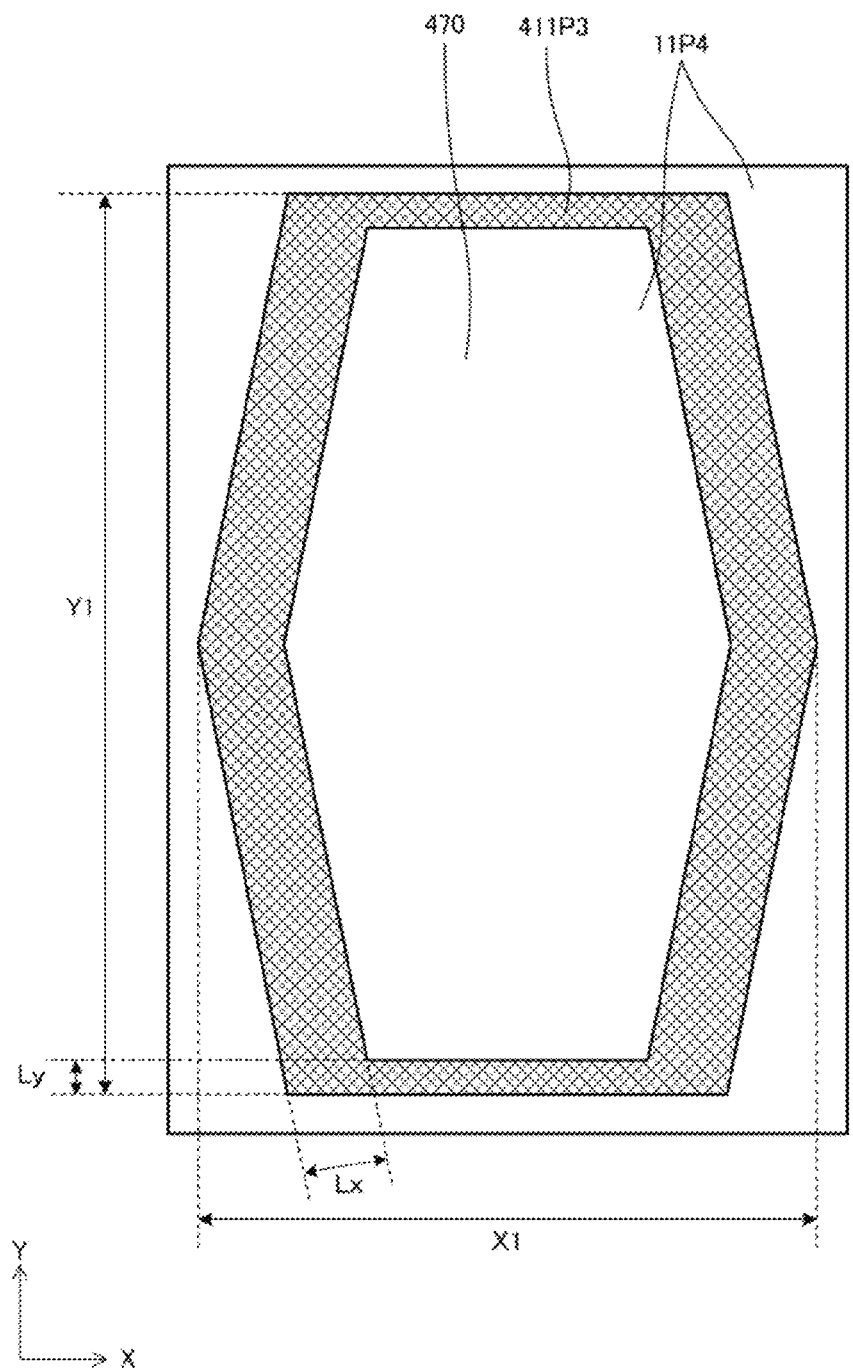
FIG. 21 is a plan view of an insulating substrate 11P4 of a touch sensor according to a modified example of a fourth embodiment of the present invention.

In addition, in the above embodiments, openings 70, 370 and 470 have rectangular shapes. However, the shapes are not so limited. For example, the opening may have diamond shapes or hexagonal shapes. In these cases, too Ly is still preferably smaller than Lx as illustrated in, for example, FIG. 21.

Lastly, it should be understood that description of each of the embodiments is illustrative only and is non-restrictive.

The scope of the present invention is indicated by the claims not by the above embodiments.

The invention claimed is:

1. A touch sensor, comprising a pressure sensor including:
   a piezoelectric film having opposed first and second principal surfaces;
   a first set of piezoelectric detection electrodes located on a peripheral area of the first principal surface and not located on a central area of the first principal surface such that the first set of piezoelectric detection electrodes forms an enclosed frame around the central area of the first principal surface; and
   a second set of piezoelectric detection electrodes located on the second principal surface;
   whereby electric charges are generated in the first and second detection electrodes as a function of an external pressure applied to the pressure sensor.

2. The touch sensor of claim 1, further including a third set of electrodes located on central area of the first principal surface, the third set of electrodes being electrically insulated from the first set of electrodes.

3. The touch sensor of claim 1, wherein the piezo electric film is elongated and has shorter lateral sides and longer longitudinal sides, the first set of electrodes form a pattern having lateral sides and longitudinal sides of the first set of electrodes, a width of the lateral sides being shorter than a width of the longitudinal sides of the first set of electrodes.

4. The touch sensor of claim 1, wherein the central area has a symmetric shape and a center axis which is coincident with a center axis of the piezoelectric film.

5. The touch sensor of claim 1, wherein the second set of piezoelectric detection electrodes are located on a peripheral area of the second principal surface and are not located in a central area of the second principal surface.

6. The touch sensor of claim 1, wherein the piezoelectric film is made of a chiral polymer.

7. The touch sensor of claim 6, wherein the chiral polymer is polylactic acid.

8. The touch sensor of claim 7, wherein the polylactic acid is poly-L-lactic acid.

9. The touch sensor of claim 1, wherein the second set of piezoelectric detection electrodes overlap the first set of piezoelectric detection electrodes.

10. A display device comprising:
    (A) an input surface;
    (B) a pressure sensor including:
       (i) a piezoelectric film having first and second opposed principal surfaces;
       (ii) a first set of piezoelectric detection electrodes located on a peripheral area of the first principal surface and are not located on a central area of the first principal surface; and
       (iii) a second set of piezoelectric detection electrodes located on the second principal surface such that the first set of piezoelectric detection electrodes forms an enclosed frame around the central area of the first principal surface, whereby electric charges are generated in the first and second detection electrodes as a function of an external pressure applied to the input surface; and
    (C) a processor for detecting an amount of pressure applied to the input surface as a function of the electric charges.

11. The touch sensor of claim 10, further including a third set of electrodes located on central area of the first principal surface, the third set of electrodes being electrically insulated from the first set of electrodes.

12. The display device of claim 10, wherein the piezo electric film is elongated and has shorter lateral sides and longer longitudinal sides, the first set of electrodes forms a pattern having lateral sides and longitudinal sides, a width of the lateral sides of the first set of electrodes being shorter than a width of the longitudinal sides of the first set of electrodes.

13. The display device of claim 10, wherein the central area has a symmetric shape and a center axis which is coincident with a center axis of the piezoelectric film.

14. The display device of claim 10, wherein the second set of piezoelectric detection electrodes are located on a peripheral area of the second principal surface and are not located in a central area of the second principal surface.

15. The display device of claim 10, wherein the piezoelectric film is made of a chiral polymer.

16. The display device of claim 15, wherein the chiral polymer is polylactic acid.

17. The display device of claim 16, wherein the polylactic acid is poly-L-lactic acid.

18. The display device of claim 10, further comprising a capacitive sensor including:
    (i) a dielectric substrate having first and second principal surfaces; and
    (ii) position detection electrodes formed on at least one of the principal surfaces of the dielectric substrate;
    wherein the capacitive sensor is located below the input surface and the pressure sensor is arranged below the capacitive sensor such that the capacitive sensor is located closer to the input surface than the pressure sensor.

19. The display device of claim 10, wherein the second set of piezoelectric detection electrodes overlap the first set of piezoelectric detection electrodes.

* * * * *